US007764628B2

(12) United States Patent
Gerber et al.

(10) Patent No.: US 7,764,628 B2
(45) Date of Patent: Jul. 27, 2010

(54) METHOD FOR CONTROLLING TRAFFIC BALANCE BETWEEN PEERING NETWORKS

(76) Inventors: Alexandre Gerber, 31 Greeenwood Ave., Madison, NJ (US) 07940; Jay Borkenhagen, 21 Braeburn Dr., Lincroft, NJ (US) 07738; Susan Martens, 34 Winchester Dr., Tinton Falls, NJ (US) 07724

( * ) Notice: Subject to any disclaimer, the term of this patent is extended or adjusted under 35 U.S.C. 154(b) by 183 days.

(21) Appl. No.: 12/009,447

(22) Filed: Jan. 18, 2008

(65) Prior Publication Data

US 2009/0185486 A1      Jul. 23, 2009

(51) Int. Cl.
*H04L 12/28* (2006.01)
*H04L 12/56* (2006.01)

(52) U.S. Cl. ........................ 370/254; 370/389
(58) Field of Classification Search ................. 370/254, 370/389, 395.31; 707/1, 100; 709/224, 229; 713/1, 185; 726/3, 22
See application file for complete search history.

(56) References Cited

U.S. PATENT DOCUMENTS

2005/0202302 A1* 9/2005 Uchiyama et al. ............. 429/34

2007/0162405 A1    7/2007   Parunak et al.

OTHER PUBLICATIONS

Teixeira, Dynamics of Hot Potato Routing in IP Networks, 2004, ACM, all pages.*
Zhang, "Rui Zhang Shen's Research", Princeton, pp. 1-3.*
Kuala, "BGP: MEDs Gone Bad!", Feb. 25, 2004, Arbor Networks, all pages.*
Muhlbauer, "Towards Reproducing Inter-Domain AS Paths", Nov. 15, 2005, Faktultat fur Informatik Technische Universitat Munchen, all pages.*
Feamster, "BorderGuard: Detecting Col Potatoes from Peers", 2004, ACM, pp. 1-6.*
Kumar, "The MASC/BGMP Architecture for Inter-Domain Multicast Routing", 1998, Univeristy of Southern California, all pages.*
Wallace, "Automated System for Load-balancing eBGP Peers", 2004, University of Florida, all pages.*

* cited by examiner

*Primary Examiner*—Kwang B Yao
*Assistant Examiner*—Adam Duda
(74) *Attorney, Agent, or Firm*—Henry Brendzel

(57) ABSTRACT

A method that measures ratio, relative to a peering network, of traffic burden of incoming traffic to traffic burden of outgoing traffic, where traffic burden takes into account traffic volume and distance that the traffic traverses through the network. A determination is made from this ratio as to whether an imbalance exists with the peering network. With the assistance of a simulation of changes in routing policy and their effects, an existing or impending imbalance is remedied by changing the routing policy relative to particular customers, for example from a "hot potato" routing policy to a "best exit" routing policy.

15 Claims, 3 Drawing Sheets

◇ EDGE ROUTER
□ ROUTER

METHOD FOR CONTROLLING TRAFFIC BALANCE BETWEEN PEERING NETWORKS

BACKGROUND OF THE INVENTION

This invention relates to a method for controlling traffic balance between peering networks.

Contact over the World Wide Web often requires communication over networks that belong to different entities. Those different networks cost money to create and maintain, and consequently one might expect that the entities that own those networks would be concerned about whether they are properly compensated for the use of their networks. Interestingly, however, the business model that took root for the World Wide Web is that each network provider is compensated only by the customers that it services and not by the other networks, even though customers of those other networks benefit from connections through the provider's network. In other words, Internet traffic typically has not been subjected to settlement processes involving the providers of the different peering networks that make up the World Wide Web.

The settlement-free Internet peering is based on the assumption that traffic flow between any pair of networks is fairly evenly balanced. Since in such a case both networks would bear approximately an equal cost in transporting Internet traffic, the benefit from a settlement process is simply not worth the expense to set up the control mechanisms (e.g., a cross-billing mechanism, or a routing restriction).

It is recognized, however, that Internet traffic can be unevenly distributed. One network may host many customers that are content-providers and few customers that are content-consumers, while another network may host few customers that are content-providers and many customers that are content-consumers. In such a case, the transport cost burdens among the various networks are unbalanced, and the imbalance may be significant. Rather than having a network that is unduly burdened with traffic refuse to carry some traffic, it would be beneficial to all if a method for balancing the traffic burdens can be realized.

SUMMARY

The problems of the prior art are ameliorated and an advance in the art is achieved with a method that measures traffic volumes between peering networks, develops a historic measure for the traffic volumes, determines whether an imbalance between peering networks exists and remedies this imbalance by switching the routing policy relative to particular customers from a "hot potato" routing policy to a "best exit" routing policy. In determining whether an imbalance exists, the method takes into account the distance that the traffic traverses through the network. One approach for determining how to remedy an imbalance employs simulation, which makes it possible to evaluate alternative solutions and select an appropriate one.

DETAILED DESCRIPTION

Figure 1:
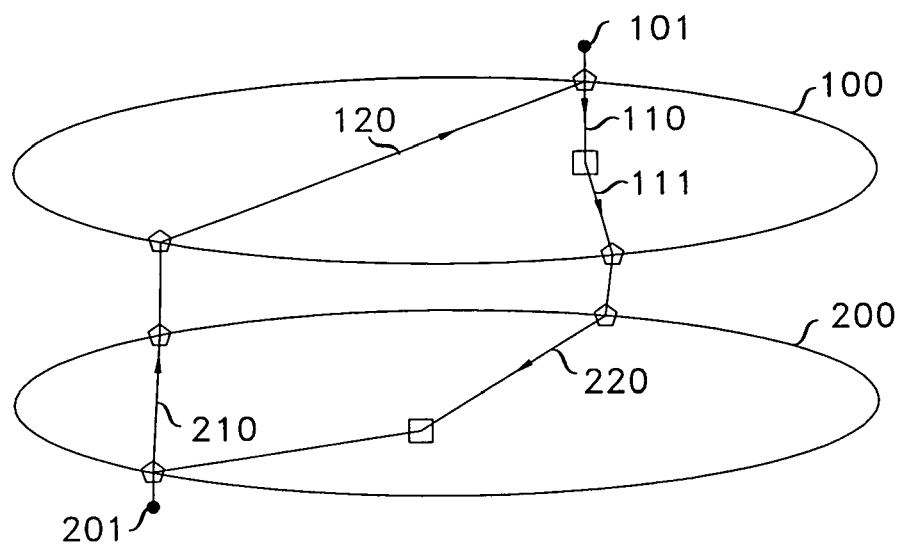
FIG. 1 shows two networks that route traffic according to a "hot potato" approach.

With reference to FIG. 1, given network 100 with customer 101, and network 200 with customer 201, traffic that is outgoing from customer 101 and destined to customer 201 is illustratively routed by the provider of network 100 via a path that includes links 110 and 111; it being the shortest path within network 100 to network 200 and presumably the least one. That forces network 200 to employ a route that includes link 220 from the point where link 111 enters network 200 to customer 201. Correspondingly for the return traffic that is outgoing from customer 201 and destined to customer 101, the provider of network 200 employs route 210; it being the shortest within network 200 and presumably the least expensive one. That forces network 100 to employ path 120 from the point where path 210 enters network 100 to customer 101.

The above-described approach of delivering traffic that is destined to another network by taking the shortest route within one's own network to that other network is known as the "hot potato" algorithm (because the provider gets rid of his traffic much like one would get rid of a "hot potato": as soon as possible). FIG. 1, thus, illustrates a situation where both network providers employ the "hot potato" algorithm.

It is noted that when both networks 100 and 200 employ the "hot potato" algorithm there is a measure of symmetry in the arrangement, and as long as the mix of flows is roughly balanced, both networks 100 and 200 are satisfied.

The "best exit" algorithm is one where a network dictates the entry point for incoming traffic, and that entry point is typically one that imposes the least burden on the network. With respect to the traffic burden on a network, the "best exit" algorithm is basically the opposite of the "hot potato" algorithm, but as long as both networks use this algorithm and the mix of traffic flows is roughly balanced, there is still a measure of symmetry in the arrangement and both networks are still satisfied. One difference between the "hot potato" algorithm and the "best exit" algorithm is that the latter requires each network to inform the other network to which edge router traffic should be sent.

Figure 2:
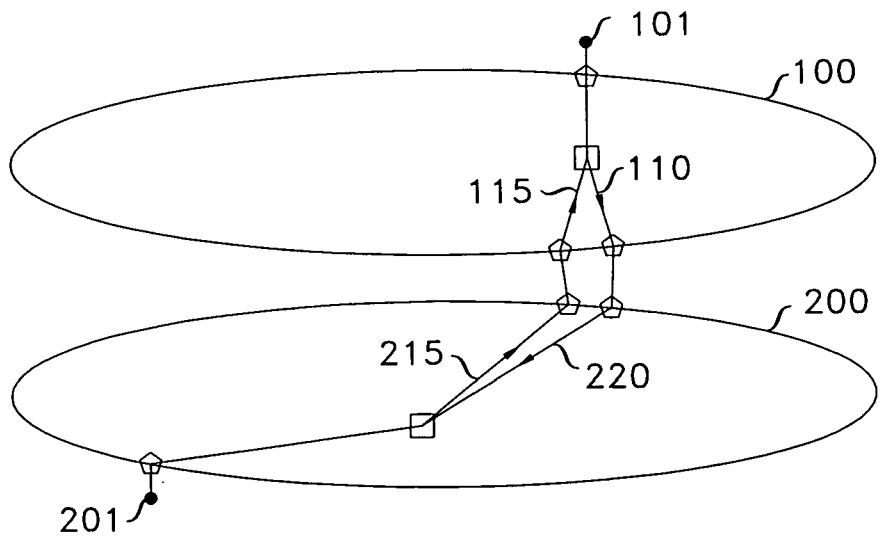
FIG. 2 shows the FIG. 1 networks where one of the networks employs the "hot potato" approach while the other network employs the "best exit" approach.

FIG. 2 shows an arrangement where the provider of network 200 employs the "best exit" algorithm while the provider of network 100 employs the "hot potato" algorithm. In this arrangement network 200 is caused to sent traffic via the path that includes link 215, and that allows network 100 to use the path that includes link 115 for traffic incoming to customer 101, and the path that includes link 115 is shorter (and hence of lower cost) than link 120. Obviously, compared to the FIG. 1 arrangement the FIG. 2 arrangement results in a lower traffic burden for network 100 and, correspondingly, a higher traffic burden for network 200. By traffic burden it is meant the amount of traffic times some measure of how much of the network is burdened by that traffic.

We realized that starting, for example, with both networks employing the "hot potato" approach, it is possible to quantify the traffic load that peering networks such as network 100 and 200 place on each other, and to thus identify situations where significant imbalance in traffic exists because of the nature of the customers that the networks handle. Once a significant imbalance is recognized, the routing approach for some of the customers can be switched from the "hot potato" approach to the "best exit" approach to ameliorate the imbalance.

Figure 3:
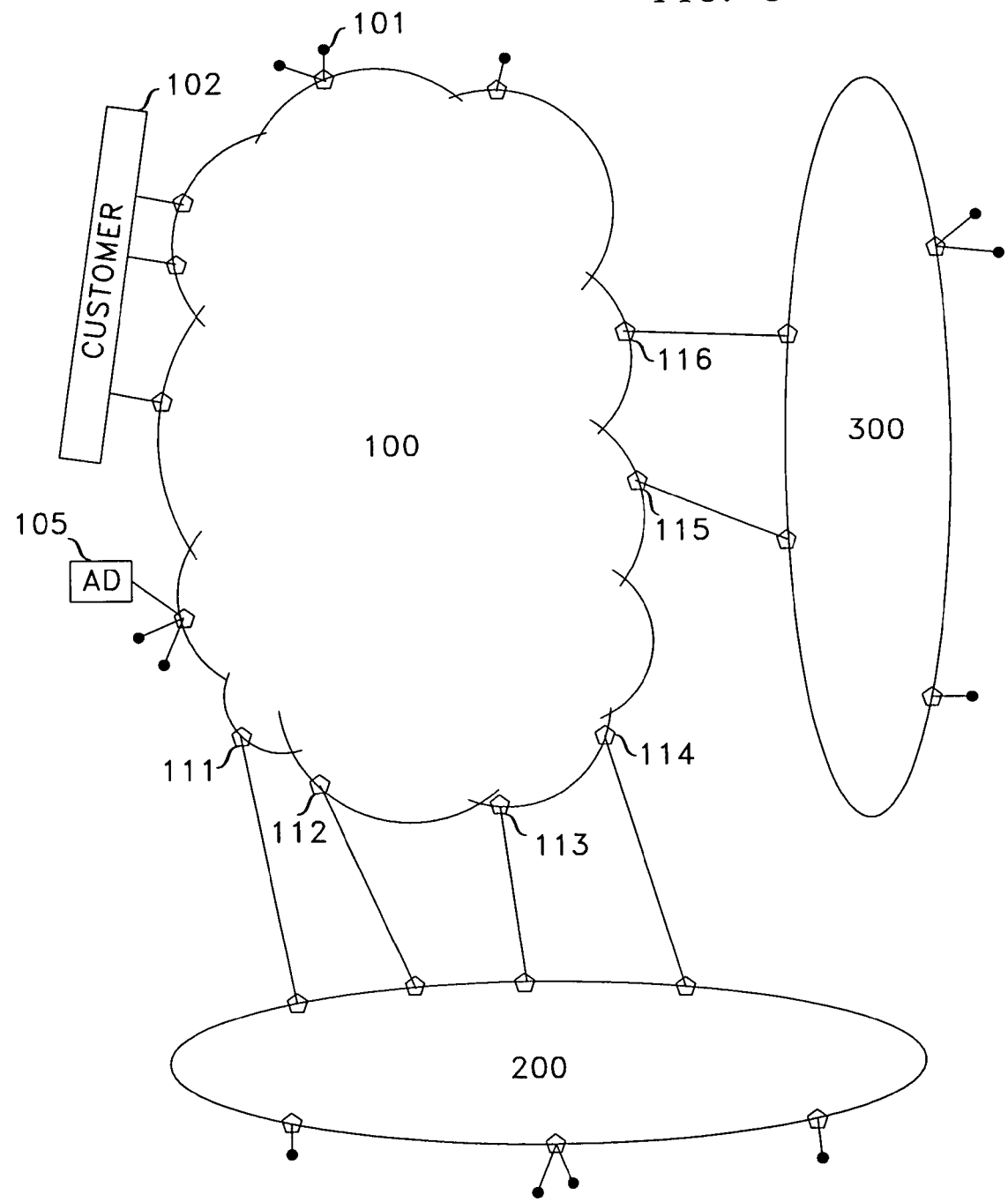
FIG. 3 depicts network 100 with an administration unit that participates in administering routing policies.

In FIG. 3, for example, network 100 has numerous individual customers such as customer 101, and customers that appear on multiple edge routers, such as customer 102. Customers that appear on multiple edge routers are typically large content-providers, such as hp.com, or Internet Service providers, such as ATT.net.

In accord with the principles disclosed herein, for each customer, administrator system (admin) 105 determines and maintains a traffic burden measure that has a historical significance, and the measurements that are used to determine the traffic burden measure come, for example, from the edge routers. The measurements comprise, for example, the amount of data that was transmitted and received in the course of one hour (data gathering interval) of each day (measurement interval), with the data gathering interval being the interval that within the measurement interval carries the most traffic. To give another example, the measurement might be of the amount of data transmitted during a 10 minute period (data gathering interval) every hour (measurement interval); or some other data gathering interval within a chosen measurement interval. Whatever approach a particular implementation employs, the result is that information is regularly sent to admin 105, illustratively sorted by customer. For customer 101, for example, for measurement interval a, admin 105 might receive the following traffic volume information (k1 through k12) from its network edge routers:

vis-à-vis network 200 (via edge routers 111, 112, 113, and 114)

a traffic outflow of $O_a^{111}(k1)$, $O_a^{112}(k2)$, $O_a^{113}(k3)$, and $O_a^{114}(k4)$ units, respectively, and a traffic inflow of $I_a^{111}(k5)$ $I_a^{112}(k6)$, $I_a^{113}(k7)$, and $I_a^{114}(k8)$ units, respectively; and vis-à-vis network 300 (via edge routers 115, and 116)

a traffic outflow of $O_a^{115}(k9)$, and $O_a^{116}(k10)$ units respectively, and a traffic inflow of $I_a^{116}(k11)$, and $I_a^{116}(k12)$ units respectively.

It should be noted that the terms above are expressed in a slightly simplified form, and that, more completely, a term such as $O_a^{111}(k1)$ should be expressed as $O_a^{101,111}(k1)$ to indicate that the flow is relative to customer 101. It may be also noted that the edge routers do not send information about the peering network (because it is known a priori); only the customer's identity, the amount of traffic, and whether it is incoming or outgoing.

The traffic flow information is send to administrative module 105 where each flow is multiplied by a distance measure, which corresponds to the distance between the edge router and the customer. Illustratively, the distance is the sum of the "air miles" of the network links that form the path from the edge router to the customer (e.g., links 110 and 111). Each flow is thus converted to a traffic burden measure.

Employing one of any number of well known techniques, admin 105 develops historical average measures of the outgoing and incoming traffic burden relative to network 200, and similar historical average measures relative to network 300. Once the historical average measures are known, a balance measure is computed for customer 101; that being, for example, the ratio of the sums of the incoming flow averages to the sum of the outgoing flow averages.

Performing the above disclosed computation for all of the customers allows admin 105 to identify whether an imbalance exists (in the sense of the average traffic flows) between network 100 and the peering networks with which it communicates, such as networks 200 and 300. Typically, an imbalance is considered to exist when the balance measure is greater than 2 or less than ½; but, of course, other thresholds can be employed.

Numerous approaches may be taken regarding the reaction to an imbalance situation. In accord with one approach, a display terminal may be associated with admin 105 (not shown in FIG. 3) and a person (Administrator) may view a listing of customers where the listing is sorted by decreasing imbalance of traffic flow, or by decreasing contribution to traffic burden. The Administrator can then decide whether to change the routing policy relative to one or more of the customers that contribute most to that imbalance. The change in routing policy may be from the "hot potato" approach to the "best exit" approach.

Alternatively, the Administrator might first simulate the change in the routing policy and observe the resulting situation prior to actually effecting the policy change. That is, recognizing that a change of policy from "hot potato" to "best exit" will shift incoming traffic (destined to a particular customer) off a heavily burdened and onto the router specified by the policy change, the Administrator might wish to simulate the resulting traffic conditions, with an eye, for example, toward maintaining a certain percentage of spare capacity in each router, and select the most appropriate route to specify in the policy change.

The simulation is, illustratively, performed by employing the data that module 105 already has, that is the messages from various routers regarding customer X, in connection with whom the Administrator is considering to change the routing policy. A copy of this data is made by the simulation module, a change in the traffic conditions is effected on the copy of the data pursuant to the proposed policy change relative to customer X, the calculation of traffic imbalance is performed, and the resulting balance situation is displayed together with the burdens on the individual edge routers and their respective spare capacities. If the situation is satisfactory, the Administrator effects the proposed policy change. Otherwise, the changes are reversed and a different proposed policy change is simulated.

Alternatively still, the process is automated by having the processor within admin 105, regular intervals, reassess the existing policies and determine whether any of the policies ought to be changed in order to bring the traffic into the desired balance, including the policies that had been changed from "hot potato" to "best exit" at an earlier time by now may be reverted to "hot potato" without undue adverse effects on the network. The automatic reassessment may also employ a simulation phase.

Figure 4:
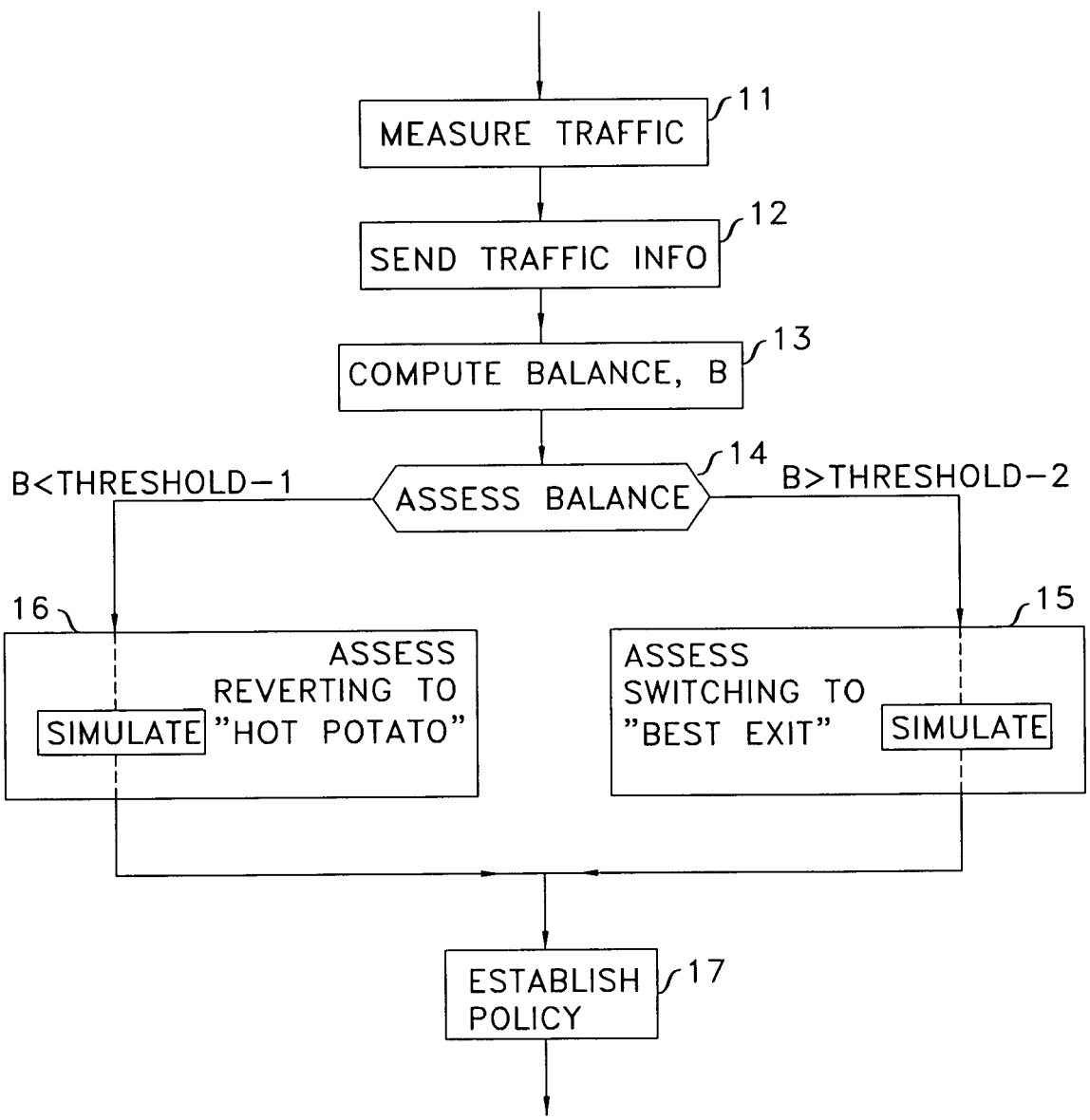
FIG. 4 presents one embodiment of method for balancing traffic in accord with the principles disclosed herein.

FIG. 4 illustrates one embodiment of a method in accord with the principles disclosed herein. In block 11 each edge router measures the traffic passing through it in both directions and keeps detailed information about that traffic (customer and amounts of data) for the data gathering interval. In case of the above example of the gathering interval being the most-busy hour, each router also keeps the detailed information for the "high water mark" hour. At the end of each hour, the router compares the currently accumulated data to the "high water mark" data, and if the current data constitutes a greater amount data flowing through the router then the current data becomes the "high water mark" hour. Otherwise, the current data is discarded.

At the end of a measurement interval, for example, at the end of a day, in accordance with block 12 each edge router sends its data to admin element 105, and element 105 computes, for each customer, and for the peering network, the traffic burden relative to each flow—where the traffic burden corresponds to the traffic volume times the distance within the network that the traffic traverses on its way to (or from) the customer. Illustratively, administrative module 105 receives the traffic flows from the routers, and for each flow the module computes the traffic burden. Then it proceeds to aggregate the data. Thus, block 13 evaluates $$Brdn(O)_a^{customer} = \sum_{edge\_routers} Brdn(O)_a^{customer,edge\_router} \quad (1)$$

and $$Brdn(I)_a^{customer} = \sum_{edge\_routers} Brdn(I)_a^{customer,edge\_router}, \quad (2)$$

for each customer, where $Brdn(O)_a^{customer}$ and $Brdn(I)_a^{customer}$, are the representative outgoing and incoming traffic burdens, respectively, for measurement interval a for a given customer.

The newly computed information is used in block 13, in conjunction with previously obtained and computed information, to develop new traffic burden averages, for example with the following calculations $$\overline{Brdn}(O)_{new}^{customer} = Brdn(O)_a^{customer} + \delta \overline{Brdn}(O)_{old}^{customer} \quad (3)$$

and $$\overline{Brdn}(I)_{new}^{customer} = Brdn(I)_a^{customer} + \delta \overline{Brdn}(I)_{old}^{customer} \quad (4)$$

where $\delta < 1$, for example 0.75. Those averages are summed to derive a measure of outgoing and incoming traffic burdens relative to a peering network.

Once the averages are computed, the balance measure vis-à-vis a given network (for example network 200) is computed by computing the ratio $$Balance_{network200} = \frac{\sum_{customers} \overline{Brdn}(O)^{customer}}{\sum_{customers} \overline{Brdn}(I)^{customer}}. \quad (6)$$

Alternatively, the computation can be executed in one step for all customers with, $$X = \sum_{customers} \left( \sum_{edge\_router} Brdn(O)_a^{customer,edg\_router} + \delta \overline{Brdn}(O)_{old}^{customer} \right) \quad (7)$$

where $\overline{Brdn}(O)_{old}^{customer}$ is the existing average outgoing traffic burden for customer, $Brnd(O)_a^{customer,edg\_router}$ is the computed outgoing traffic burden from customer to edge_router, $\delta$ is less than 1, and the new measure of average incoming traffic burden is computed from $$Y = \sum_{customers} \left( \sum_{edge\_router} Brdn(I)_a^{customer,edg\_router} + \delta \overline{Brdn}(I)_{old}^{customer} \right). \quad (60)$$

where $\overline{Brdn}(I)_{old}^{customer}$ is the existing average incoming traffic burden for customer, and $Brdn(I)_a^{customer,edg\_router}$ is the computed incoming traffic burden from customer to edge_router. The balance is then $$Balance_{network200} = \frac{X}{Y}. \quad (8)$$

Once the balance measure is obtained, control passes to block 14, which assesses whether a change in policy is necessary. As indicated above, a balance measure of 0.5 or less indicates an imbalance in that the outgoing flow is small relative to the incoming flow. Since a high incoming flow is undesirable when network 200 employs the "hot potato" approach and network 100 must carry the incoming traffic possibly over large distances, at some threshold TH-1 that is somewhat larger than 0.5 it behooves admin 105 to switch at least some of the customers to a "best exit" approach. Correspondingly, a balance measure of 2 or more also indicates an imbalance in that the outgoing flow is large relative to the incoming flow. Since this imbalance suggests that network 200 suffers an undue traffic load, it makes sense for admin 105 to consider whether relative to some of its customers the "best exit" approach is in force and, if that is the case, whether it makes sense to revert to the "hot potato" approach. These considerations, including simulations of effects of changing the routing policies, are carried out in blocks 15 and 16, respectively. Control then passes to block 17 where the decisions made in block 15 or 16 are effected.

As suggested earlier, the work of blocks 15, 16 and 17 can be assigned to an individual who is presented with a complete set of listings of the balance measures of all peering networks, or the listings of those peering networks where there is an imbalance. Each listing identifies the customers that are significant contributors to the imbalance, and this allows the person to ameliorate the imbalance by selecting specific customer for whom the routing policy is switch from one approach to the other approach. Advantageously, the person would consider a routing policy changer relative to a customer, simulate the effect of this change, observer the impact on the peering capacity, observe the impact on the traffic burden on its own network (traffic volume time the "air miles that the traffic traverses) and determines whether the considered policy change is beneficial. If so, the person effects the routing policy change.

A "best exit" policy, vis-à-vis a particular network for a particular customer is implemented by causing the relevant edge routers to announce the Interior Gateway protocol (IGP) distance to the that particular customer and to inform the peering network that it should employ the announced IGP distance in selecting the edge router to which data for that particular customer is sent. Thus, for example, if it is decided that the incoming traffic of customer 101 from network 200 causes an imbalance, admin 105 directs edge routers 111 through 114 are informed to advertise the IGP distance to customer 101 so that network 200 will use the "best exit" approach for sending data to customer 101.

The invention claimed is:

1. A method executed by an administration module coupled to a given network, comprising:
   relative to a network that is a peering network of said given network
   receiving information that informs said module of data flow incoming from said peering network to said given network and data flow outgoing from said given network to said peering network, and also informs said module of customers of said given network from which said outgoing data flows and to which said incoming data flows;

for each of said customers, developing from said information traffic burden data and employing the developed data, together with previously developed measures of average outgoing and incoming data flows, new measures of average outgoing and incoming data flows;

developing for said given network a new measure of average outgoing and incoming data flows from said new measures of average outgoing and incoming data flows;

reaching a determination, from a ratio of said new average outgoing data flow and said new average incoming data flow, regarding an imbalance condition relative to said peering network;

when said determination reveals a condition that approaches or crosses into said imbalance condition, changing policy relative to routing of incoming flows to at least one of said customers of said given network from a first algorithm to a second algorithm.

2. The method of claim 1 where said step of changing policy includes a step of considering a change in policy and simulating effect of such a change.

3. The method of claim 1 where said information that is received is received from each of edge routers of said given network that are coupled to said peering network.

4. The method of claim 3 where said second algorithm is an algorithm that directs a peering network as to how to route flows of traffic that is incoming to said given network.

5. The method of claim 3 where said second algorithm is effective relative to a subset of said customers.

6. The method of claim 4 where said second algorithm is the "best exit" algorithm.

7. The method of claim 3 where said second algorithm is effected by said administrative module directing said edge routers to announce their respective IGP distances to each of said at least one of said customers that is used in selecting an edge router of said edge routers to which data for each of said at least one of said customers is sent.

8. The method of claim 3 said information that is received from said each edge router is a measure of data flows during a gathering interval within a measurement time interval.

9. The method of claim 8 where said gathering interval is a time interval of preselected duration, within said measurement time interval, during which outgoing data flow to said edge router plus incoming data flow data flow to said edge router is highest within said measurement time interval.

10. The method of claim 9 where said gathering interval is an hour and said measurement interval is a day.

11. The method of claim 1 where, in said step of developing, said new measure of average outgoing and incoming data flows combines data that is related to said previously developed measure of average outgoing and incoming data flows with said received information.

12. The method of claim 1 where, in said step of developing, said new measure of average outgoing data flow is computed from $$\sum_{customers}\left(\sum_{edge\_router} Brdn(O)_a^{customer,edg\_router} + \delta \overline{Brdn}(O)_{old}^{customer}\right)$$

where $\overline{Brdn}(O)_{old}^{customer}$ is the existing average outgoing traffic burden for customer, $Brdn(O)_a^{customer,edg\_router}$ is the received outgoing traffic burden from customer to edge_router, $\delta$ is less than 1, and said new measure of average incoming traffic burden is computed from $$\sum_{customers}\left(\sum_{edge\_router} Brdn(I)_a^{customer,edg\_router} + \delta \overline{Brdn}(I)_{old}^{customer}\right)$$

where $\overline{Brdn}(I)_{old}^{customer}$ is the existing average incoming traffic burden for customer, and $Brdn(I)_a^{customer,edg\_router}$ is the received incoming traffic burden from customer to edge_router.

13. The method of claim 1 where said condition approaches or crosses into said imbalance condition when said ratio is below a first threshold or above a second threshold.

14. The method of claim 1 where said first algorithm is a "hot potato" algorithm, and said second algorithm is a "best exit" algorithm, or said first algorithm is said "best exit" algorithm and said second algorithm is said "hot potato" algorithm.

15. The method of claim 1, executed relative to each of a plurality of peering networks of said given network.

* * * * *